United States Patent
Giles et al.

(10) Patent No.: US 12,486,827 B2
(45) Date of Patent: Dec. 2, 2025

(54) WHIRLING MODE CONTROL OF A WIND TURBINE BASED ON TOWER MEASUREMENTS

(71) Applicant: VESTAS WIND SYSTEMS A/S, Aarhus N (DK)

(72) Inventors: Alexander Duncan Giles, Oporto (PT); Jesper Sandberg Thomsen, Hadsten (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 18/705,625

(22) PCT Filed: Oct. 28, 2022

(86) PCT No.: PCT/DK2022/050223
§ 371 (c)(1),
(2) Date: Apr. 29, 2024

(87) PCT Pub. No.: WO2023/072355
PCT Pub. Date: May 4, 2023

(65) Prior Publication Data
US 2025/0003382 A1     Jan. 2, 2025

(30) Foreign Application Priority Data
Oct. 28, 2021   (DK) .............................. PA202170523

(51) Int. Cl.
*F03D 7/02*   (2006.01)

(52) U.S. Cl.
CPC ......... *F03D 7/0224* (2013.01); *F03D 7/0296* (2013.01); *F05B 2270/334* (2013.01); *F05B 2270/807* (2013.01)

(58) Field of Classification Search
CPC ............... F03D 7/0224; F03D 7/0296; F05B 2270/334; F05B 2270/807
See application file for complete search history.

(56) References Cited

U.S. PATENT DOCUMENTS 11,136,962 B2 *  10/2021  Pedersen ............... F03D 7/0224
11,421,652 B2 *   8/2022  Thomsen ............... F03D 7/0224
(Continued)

FOREIGN PATENT DOCUMENTS

WO   WO-2017092773 A1 *  6/2017  ........... F03D 7/0296
WO      2017174094 A1    10/2017
(Continued)

OTHER PUBLICATIONS

Danish Patent and Trademark Office, 1st Technical Examination including The Search Report and Search Opinion for Application PA 2021 70523 dated May 3, 2022.
(Continued)

*Primary Examiner* — Tulsidas C Patel
*Assistant Examiner* — Thomas K Quigley
(74) *Attorney, Agent, or Firm* — Patterson + Sheridan, LLP; Gero G. McClellan

(57) ABSTRACT

The invention relates to adjusting pitch of rotor blades of a wind turbine. An acceleration signal is received from a wind turbine acceleration sensor and is indicative of side-to-side motion of the wind turbine tower. A first component in a fixed coordinate frame of the wind turbine is determined based on the received acceleration signal. The first component is indicative of a whirling mode of the wind turbine caused by edgewise vibrations of the rotor blades. A second component is generated based on the first component and is orthogonal to the first component. A control action is applied to obtain first and second control components for mitigating the whirling mode. An inverse m-blade coordinate transfor-
(Continued)

mation is applied to the first and second control components to obtain pitch reference offset values in a rotor coordinate frame of the wind turbine, which are used to adjust pitch of the rotor blades.

20 Claims, 8 Drawing Sheets

(56) References Cited

U.S. PATENT DOCUMENTS

| | | |
|---|---|---|
| 2011/0229300 A1 | 9/2011 | Kanev et al. |
| 2012/0257967 A1 | 10/2012 | Egedal et al. |
| 2021/0207583 A1 | 7/2021 | Dalsgaard et al. |
| 2021/0231102 A1 | 7/2021 | Thomsen et al. |
| 2021/0277869 A1 | 9/2021 | Vasudevan et al. |

FOREIGN PATENT DOCUMENTS

| | | | |
|---|---|---|---|
| WO | WO-2019214786 A1 * | 11/2019 | ........... F03D 7/0224 |
| WO | 2020239177 A1 | 12/2020 | |
| WO | 2020239178 A1 | 12/2020 | |

OTHER PUBLICATIONS

PCT International Search Report and Written Opinion of The International Searching Authority for Application PCT/DK2022/050223 dated Jan. 26, 2023 (Jan. 26, 2023).

\* cited by examiner

WHIRLING MODE CONTROL OF A WIND TURBINE BASED ON TOWER MEASUREMENTS

FIELD OF THE INVENTION

The invention relates to controlling a wind turbine to mitigate whirling mode content based on measurements associated with the wind turbine tower. In particular, the invention relates to controlling pitch of rotor blades of the wind turbine based on measurements indicative of side-to-side motion of the wind turbine tower.

BACKGROUND

Wind turbines as known in the art include a wind turbine tower supporting a nacelle and a rotor with a number of (typically, three) pitch-adjustable rotor blades mounted thereto. A wind turbine is prone to vibrations such as nacelle movement or rotor blade movement. It is known that certain types of vibrations may be damped by active pitching of the rotor blades or adjusting generator torque.

Edgewise vibrations of the rotor blades are generally undesirable as the blades are typically weakly damped in that direction, and so there is a greater risk of damage to the blades as a result of vibrations in the blade edgewise direction compared to the blade flapwise direction, for instance. In particular, rotor blades may be excited to oscillate in whirling modes as a result of edgewise vibrations, which can increase wear on various wind turbine components.

It is generally known to base individual pitch control of rotor blades on blade load sensor signals, such as blade load sensors placed in the root section of a blade. Individual pitch control typically relies on all three blade sensor measurements being available. If one sensor goes offline and becomes unavailable to a blade pitch controller, then one option is for the wind turbine to be derated in a safe mode to ensure operation well within the design load envelope. This is disadvantageous in that it causes the turbine to operate in a less efficient manner, thereby negatively impacting on energy capture.

In the event of one of the blade sensor measurements being unavailable, it may be possible to estimate the unavailable blade load based on the other two (available) blade sensor measurements in order to avoid needing to derate wind turbine operation.

However, such an approach would not be feasible if two or more of the blade sensor measurements are unavailable. Furthermore, approaches based on blade measurement signals are clearly not possible for wind turbines that do not include such blade load sensors. There is therefore still a need for further approaches that are aimed at mitigating edgewise blade vibrations, e.g. vibrations that lead to whirling modes.

It is against this background to which the present invention is set.

SUMMARY OF THE INVENTION

According to an aspect of the invention there is provided a controller for a wind turbine having three rotor blades. The controller is for adjusting pitch of the three rotor blades. The controller is configured to receive an acceleration signal from an acceleration sensor located in a tower or a nacelle of the wind turbine. The acceleration signal is indicative of side-to-side motion of the tower or nacelle of the wind turbine. The controller is configured to determine at least one first component in a fixed coordinate frame of the wind turbine based on the received acceleration signal. The at least one first component is indicative of a whirling mode of the wind turbine caused by edgewise vibrations of one or more of the rotor blades. The controller is configured to generate, based on the or each determined first component, at least one second component in the fixed coordinate frame that is orthogonal to the or each respective first component. The controller is configured to apply a control action to the first and second components to obtain respective first and second control components for mitigating the whirling mode. The controller is configured to apply an inverse m-blade coordinate transformation to the first and second control components to obtain pitch reference offset values for the respective rotor blades in a rotor coordinate frame of the wind turbine. The controller is configured to transmit a control signal to adjust pitch of the rotor blades based on the obtained pitch reference offset values.

Each second component in the fixed coordinate frame is generated by application of a second-order generalised integrator (SOGI) to each respective first component. The second-order generalised integrator may be regarded as a second-order resonance transfer function. One advantage of applying a SOGI to generate the second component is that it essentially guarantees a 90 degrees phase shift.

Applying the control action may comprise application of a gain-scheduled controller to each pair of first and second components.

An output of the gain-scheduled controller may be a first vector pointing in a first direction in the fixed frame. Each pair of first and second control components may form a second vector pointing in a second direction in the fixed frame, where the second vector may be determined to counteract the first vector.

Determining one of the one or more first components may comprise applying a notch filter to remove backward whirling content from the acceleration signal but retain forward whirling content. Alternatively, or in addition (such as in parallel), determining one of the one or more first components may comprise applying a notch filter to remove forward whirling content from the acceleration signal but retain backward whirling content.

Determining the first components may comprise determining a first forward component indicative of a forward whirling mode of the wind turbine and determining a first backward component indicative of a backward whirling mode of the wind turbine. Generating the second components may comprise generating a second forward component orthogonal to the first forward component and generating a second backward component orthogonal to the first backward component. Applying the control action to the first and second components may comprise applying the control action to the first and second forward components and applying the control action to the first and second backward components, and combining the resulting components to obtain the first and second control components.

Determining the at least one first component may comprise application of a notch filter to remove 1P content from the received acceleration signal.

Determining the at least one first component may comprise application of a notch filter to remove tower first mode content from the acceleration signal.

Determining the at least one first component may comprise application of a high pass filter to remove steady-state content from the received acceleration signal.

The inverse m-blade coordinate transformation may be an inverse Coleman transformation.

The controller may be configured to receive a blade load signal from a blade load sensor located in each respective rotor blade of the wind turbine. The controller may be configured to adjust pitch of the three rotor blades as described above only if the blade load signal from at least one of the blade load sensors is unavailable to the controller.

The controller may be configured to adjust pitch of the three rotor blades as described above only if the blade load signal from at least two of the blade load sensors is unavailable to the controller.

According to another aspect of the invention there is provided a wind turbine comprising a controller as described above.

According to another aspect of the invention there is provided a method for adjusting pitch of rotor blades of a wind turbine. The method comprises receiving an acceleration signal from an acceleration sensor located in a tower or a nacelle of the wind turbine, the acceleration signal being indicative of side-to-side motion of the tower or nacelle of the wind turbine. The method comprises determining at least one first component in a fixed coordinate frame of the wind turbine based on the received acceleration signal, the at least one first component being indicative of an edgewise whirling mode of the wind turbine. The method comprises generating, based on each determined first component, at least one respective second component in the fixed coordinate frame that is orthogonal to the respective first component. The method comprises applying a control action to each pair of first and second components to obtain respective first and second control components for mitigating the edgewise whirling mode. The method comprises applying an inverse m-blade coordinate transformation to the first and second control components to obtain pitch reference offset values for the respective rotor blades in a rotor coordinate frame of the wind turbine. The method comprises transmitting a control signal to adjust pitch of the rotor blades based on the obtained pitch reference offset values.

According to another aspect of the invention there is provided a non-transitory, computer-readable storage medium storing instructions thereon that when executed by one or more processors cause the one or more processors to perform the method described above.

BRIEF DESCRIPTION OF THE DRAWINGS

Examples of the invention will now be described with reference to the accompanying drawings, in which.

DETAILED DESCRIPTION

Figure 1:
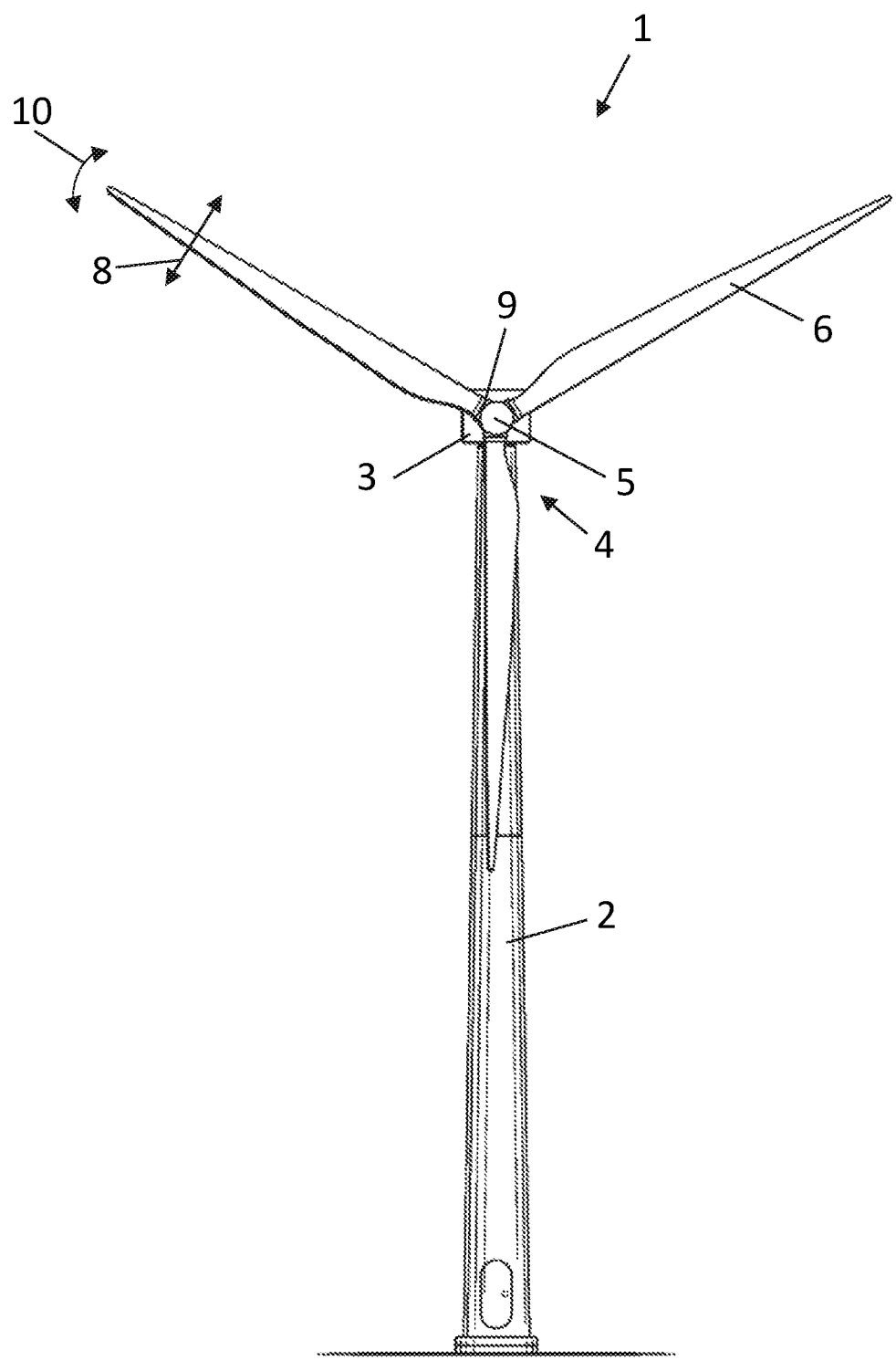
FIG. 1 schematically illustrates a wind turbine in accordance with an aspect of the invention.

FIG. 1 illustrates, in a schematic view, an example of a wind turbine 1. The wind turbine 1 includes a tower 2, a nacelle 3 disposed at the apex of, or atop, the tower 2, and a rotor 4 operatively coupled to a generator housed inside the nacelle 3. In addition to the generator, the nacelle 3 houses other components required for converting wind energy into electrical energy and various components needed to operate, control, and optimise 35 the performance of the wind turbine 1. The rotor 4 of the wind turbine 1 includes a central hub 5 and three rotor blades 6 that project outwardly from the central hub 5. Moreover, the wind turbine 1 comprises a control system or controller (not shown in FIG. 1). The controller may be placed inside the nacelle 3, in the tower 2 or distributed at a number of locations inside (or externally to) the turbine 1 and communicatively connected to one another. The rotor blades 6 are pitch-adjustable. The rotor blades 6 can be adjusted in accordance with a collective pitch setting, where each of the blades are set to the same pitch value. In addition, the rotor blades 6 are adjustable in accordance with individual pitch settings, where each blade 6 may be provided with an individual pitch setpoint.

In some examples, the wind turbine 1 may include blade load sensors placed at each blade root 9 in a manner such that the sensor detects loading in the blade 6. Blade load signals from such sensors may be used to determine how to adjust the pitch of each of the individual blades 6. Depending on the placement and the type of sensor, loading may be detected in the flap (flapwise) direction 10 (in/out of plane) or in the edge (edgewise) direction 8 (in-plane). Such sensors may be strain gauge sensors or optical Bragg-sensors, for instance. As the sensors are placed on the rotating blades 6, such load signals for each of the adjustable rotor blades 6 are measured in the rotating reference frame of the rotor 4.

Figure 2:
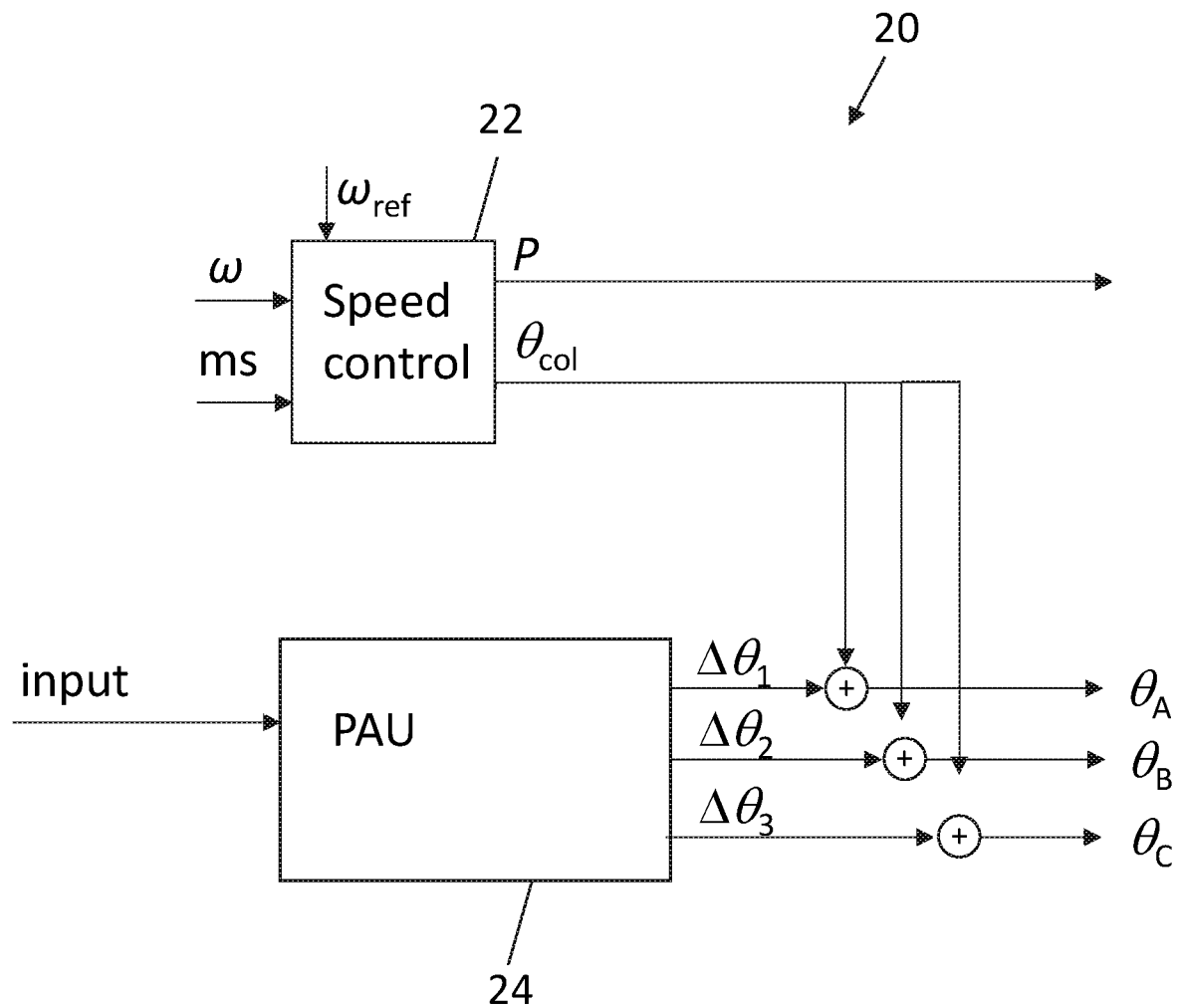
FIG. 2 schematically illustrates a controller of the wind turbine of FIG. 1 in accordance with an aspect of the invention.

FIG. 2 schematically illustrates an example of an overall controller 20 (of the wind turbine 1) that includes a feedback speed controller or control block 22 implemented to determine individual pitch actuation signals capable of reducing blade loads experienced by the rotor blades 6. In the illustrated implementation, the speed controller 22 minimises a speed error ($\omega - \omega_{ref}$) between the actual rotor speed, $\omega$, and a reference rotor speed, $\omega_{ref}$, in order to output a requested power P (in the form of a power setpoint) and a collective pitch reference, ecol. The collective pitch reference as determined by the speed controller 22, in view of the rotor speed, may also take further sensor values into account. This is referred to in FIG. 2 as a measurement set, ms, being input into the speed controller 22. The feedback speed controller 22 may be implemented by a PI (proportional-integral), PID (proportional-integral-derivative), or similar control scheme. In one example, the speed controller 22 may alternatively be a model predictive controller which, based on minimising a cost function, is arranged to determine the collective pitch reference and/or the power reference.

FIG. 2 further illustrates a blade load reducing control block 24, of the overall controller 20, which may be referred to as a pitch actuation unit (PAU). In the pitch actuation unit 24, pitch modification signals ($\Delta\theta_1$, $\Delta\theta_2$, $\Delta\theta_3$) are being determined based on one or more input signals. In some methods, the input signals include blade load signals from load sensors in the blades 6.

The PAU control unit 24 determines pitch modification signals, or pitch reference offset values, ($\Delta\theta_1$, $\Delta\theta_2$, $\Delta\theta_3$) for each rotor blade 6. These offsets are superimposed onto the collective pitch reference to provide resulting or overall pitch modification signals ($\theta_A$, $\theta_B$, $\theta_C$) that can be applied to the pitch actuators of the rotor blades 6 individually.

In the example shown in FIG. 2, a collective pitch reference for the pitch-adjustable rotor blades 6 is being determined based on a rotor speed, and a resulting pitch modification signal is applied to the pitch-adjustable rotor blades 6. The resulting pitch modification signal is applied to the pitch-adjustable rotor blades 6 individually, and for each individual blade 6 is based on a signal of the collective pitch reference and the respective individual pitch modification signal. In one example, the individual pitch modification signal is being applied in a cyclic manner. Thus, pitch actuation signals are determined for each pitch adjustable rotor blade 6 based on the pitch modification signal for each rotor blade 6.

In cases in which the PAU control unit 24 uses blade load signals as the input, there may be some situations in which one or more of the blade load measurements from the blade load sensors are unavailable to the control unit, e.g. if one or more of the sensors develops a fault, or if there is a communication breakdown between one or more of the sensors and the PAU control unit. Also, in some examples the wind turbine 1 may not include blade load sensors disposed in the rotor blades.

The present invention is advantageous in that it provides an approach for determining pitch reference offset values, ($\Delta\theta_1$, $\Delta\theta_2$, $\Delta\theta_3$)—and therefore resulting pitch modification signals ($\theta_A$, $\theta_B$, $\theta_C$)—that does not require blade load measurements as an input to the PAU control unit 24. Instead, the PAU control unit 24 only requires a measurement indicative the motion of the tower 2 or nacelle 3 in order to determine pitch reference offset values. In this way, the invention can advantageously be used as a failsafe or fallback in the event that blade load sensor measurements become unavailable to prevent the turbine needing to be operated in a derated mode. Alternatively, the invention can advantageously provide cost and weight savings as it negates the need to retrofit load sensors in the rotor blades of a wind turbine that is not fitted with such sensors.

The invention particularly provides an approach for adjusting pitch of wind turbine rotor blades to control edgewise whirling content caused by edgewise vibrations of the rotor blades. When the rotor of a wind turbine is turning, oscillations of the blades relative to their edgewise axes can cause movement of the blade in the same plane as the plane of rotation of the rotor. It will be appreciated that the rotor shaft is effectively mounted at one of its ends and is unsupported at the hub end where the blades are attached. As edgewise oscillation of the blades excites the rotor with a force that is transverse to its longitudinal axis, then in resonant conditions this may result in the rotational axis of the rotor shaft describing an erratic pattern of motion. This phenomenon may be referred to as 'whirling'. This phenomenon may typically be present for higher wind speeds.

This apparently complex pattern of motion of the rotor is the result of two circularly rotating force vectors that are generated by the combined oscillatory behaviour of the blades. A first force vector rotates in the same rotational direction as the rotor but at a higher frequency (progressive force vector) and a second force vector that rotates in a direction opposite to that of the rotor and at a lower frequency (regressive force vector). The result of the rotating progressive and regressive force vectors is a force vector that traces an elliptical path, when viewed in a fixed reference frame aligned with the nacelle.

The phase differences between the edgewise oscillations of the blades determines whether whirling occurs in the same direction as the rotor rotation, which may be referred to as 'forward whirl' or a 'forward whirling mode', or whether whirling occurs in a direction opposite to that of the rotor rotation, which may be referred to as 'backward whirl' or a 'backward whirling mode'.

Whirling of the rotor shaft imparts lateral forces to the nacelle via the rotor and therefore causes it to sway from side to side. This motion is detectable by monitoring the behaviour of the nacelle or upper portion of the tower, and motion above a certain level may be regarded as indicative of the rotor blades oscillating unacceptably in the edgewise direction. This motion can be used to identify and quantify blade edgewise vibrations and take mitigating action, as will be described in greater detail below.

As mentioned above, edge whirling control may be achieved via the use of blade edge load sensors. Such edgewise load signals are measured in a rotating reference frame. The edgewise load signals may be coordinate transformed by an m-blade (multi-blade) coordinate transformation in the form of a Coleman transformation. The transformation takes the three rotating signals into a fixed reference frame along a first reference direction D and a second reference direction Q. The fixed reference frame may be referred to as a whirling reference frame. The transformation makes it possible to distinguish backward whirling from forward whirling, both being different manifestations of the edge $1^{st}$ mode. The Coleman transformation may be defined as follows:

$$\begin{bmatrix} M_d \\ M_q \end{bmatrix} = \begin{bmatrix} \cos(\psi) & \cos(\psi + 2\pi/3) & \cos(\psi - 2\pi/3) \\ \sin(\psi) & \sin(\psi + 2\pi/3) & \sin(\psi - 2\pi/3) \end{bmatrix} \begin{bmatrix} M_a \\ M_b \\ M_c \end{bmatrix}$$

where $M_{abc}$ is a bending moment vector, which could be in either the edge or flap direction, and $\psi$ is the phase. When the phase is set as the rotor azimuth, backward whirling appears at the edge frequency minus 1P (i.e. rotational frequency, obtained from the rotor speed), while forward whirling appears at the edge frequency plus 1P. The edge frequency may be regarded as a known parameter that may be accessed via a look-up table or similar in a memory module. The edge frequency may however be specific to a specific wind turbine structure but change for different operating points of the wind turbine. Edge whirling appears at the same frequencies in the tower side-to-side acceleration. Thus, applying the rotor azimuth to the Coleman transformation applied on edge loads may be viewed as analogous to expressing the whirling loads in the fixed frame. The output of the Coleman transformation is a DQ vector, i.e. a vector in the fixed coordinate frame.

When using edge load signals for whirling control, it is noted that backward whirling appears in both the D and the Q components when the Coleman transformation uses rotor azimuth. Furthermore, the backward whirling content in the Q component is orthogonal to the backward whirling content in the D component. The same behaviour is observed for forward whirling. The Coleman-transformed signals are then subjected to some control action (for mitigating the whirling modes), generating pitch reference offsets as expressed in the fixed frame. These signals are then transformed back into the rotor frame or rotational reference frame via an inverse Coleman transformation. The output is a vector containing the pitch reference offsets for the three blades. As the backward and forward whirling modes are both manifestations of the same edge $1^{st}$ mode, both pitch reference offsets in response to forward whirling content and pitch reference offsets in response to backward whirling content are sinusoids at the edge frequency, as expected.

As mentioned above, edge whirling can be detected in the tower side-to-side acceleration. The invention utilises this fact to determine pitch reference offset values to mitigate whirling modes based on tower motion instead of using blade load signals, e.g. when one or more blade load signals are unavailable for whatever reason. When using tower measurements as the input signal, it will be appreciated that the control scheme begins in the fixed coordinate frame, i.e. the initial m-blade (Coleman) transformation when blade load signals are used is bypassed. However, to move or transform into the rotational reference frame, the inverse m-blade (Coleman) transformation is still needed.

From the above description relating to the use of blade load sensors it will be understood that the tower measurements need to be given as a DQ pair, i.e. two orthogonal components in the fixed reference frame are needed in order to perform an inverse m-blade transformation in a manner that will provide suitable pitch reference offset values that will mitigate whirling modes of the wind turbine. In particular, failure to provide a suitable pair of components in the fixed reference frame will likely result in additional and unwanted pitch reference offsets with content at frequencies other than the edge frequency. While side-to-side motion of the wind turbine tower may be regarded as a relatively good marker or indication of edge whirling content, fore-aft tower motion is not.

As such, the input signal only includes one component in the fixed coordinate frame that may be used for determining pitch reference offsets for mitigating whirling content, and a second component must be generated or synthesised in order that the inverse m-blade transformation may be used. In particular, such a second component may be generated using the first component.

A frequency-adaptive, second-order generalised integrator (SOGI) is used to generate a second component in the fixed frame based on first component that itself is obtained from a tower side-to-side acceleration signal, where the second component is orthogonal to the first component. An example topology of such a SOGI 30 is illustrated schematically in FIG. 3. The illustrated SOGI 30 is tailored to a forward whirling control unit, where the forward whirling frequency (i.e. edge frequency plus 1P) is used as the reference frequency. For a backward whirling control unit, the resonant or reference frequency would instead be set to the backward whirling frequency (i.e. edge frequency minus 1P). As indicated in the figure, while the input to the SOGI 30 is a single signal indicative of side-to-side tower motion in the fixed reference frame, the output from the SOGI 30 is first and second mutually orthogonal components $\ddot{x}_{tow}^{\alpha}$, $\ddot{x}_{tow}^{\beta}$ in the fixed frame on which the inverse m-blade transformation may be based. An illustrative plot of the first and second components $\ddot{x}_{tow}^{\alpha}$, $\ddot{x}_{tow}^{\beta}$ over time is shown in FIG. 4.

A SOGI is a second order transfer function that ensures a 90 degrees phase shift between signals (as the components need to be orthogonal, as mentioned above).

Figure 5:
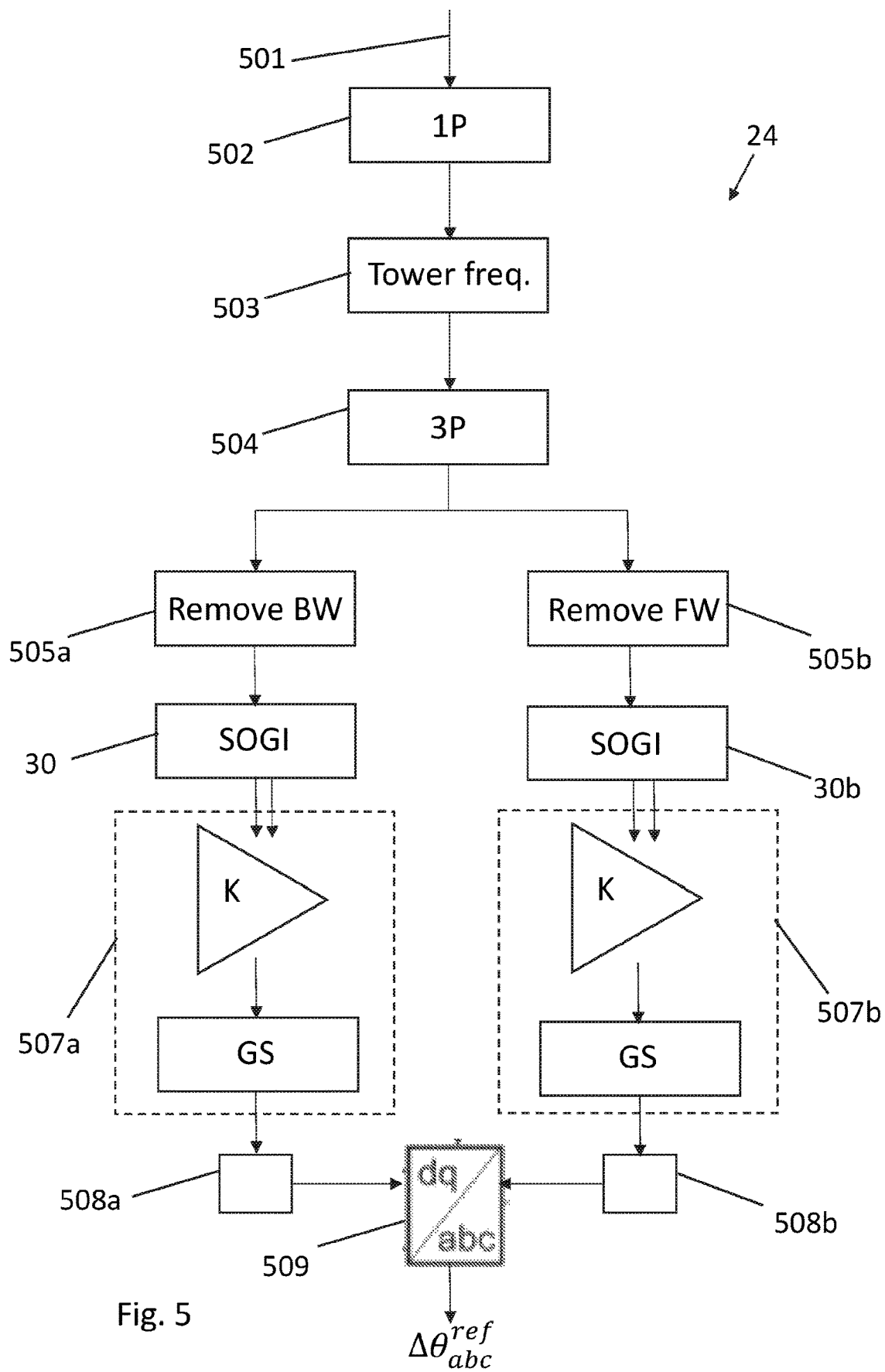
FIG. 5 schematically illustrates components of the controller of FIG. 2, including the SOGI of FIG. 3.

FIG. 5 illustrates an example of the components or functional units of the PAU control unit 24 that determines pitch reference offset values based on tower or nacelle measurement signals in order to mitigate whirling modes caused by blade edgewise vibrations. The input signal 501 is a sensor signal indicative of side-to-side motion of the tower 2 of the wind turbine 1. For instance, this may be a signal indicative of side-to-side acceleration of the tower top or the nacelle 3 of the turbine 1, and may be received from an accelerometer located at the top of the tower 2 or in the nacelle 3.

Figure 3:
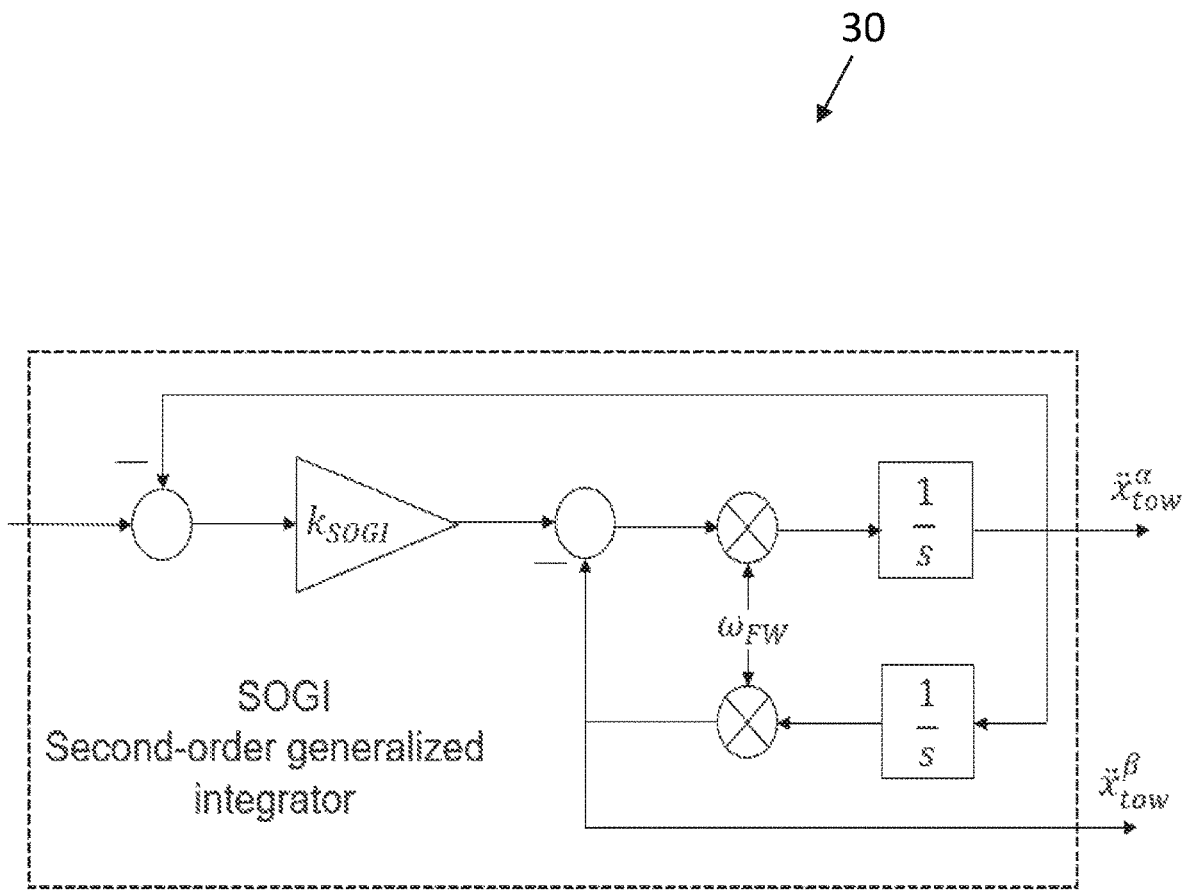
FIG. 3 schematically illustrates a second-order generalised integrator (SOGI) that is implemented by the controller of FIG. 2.
Figure 4:
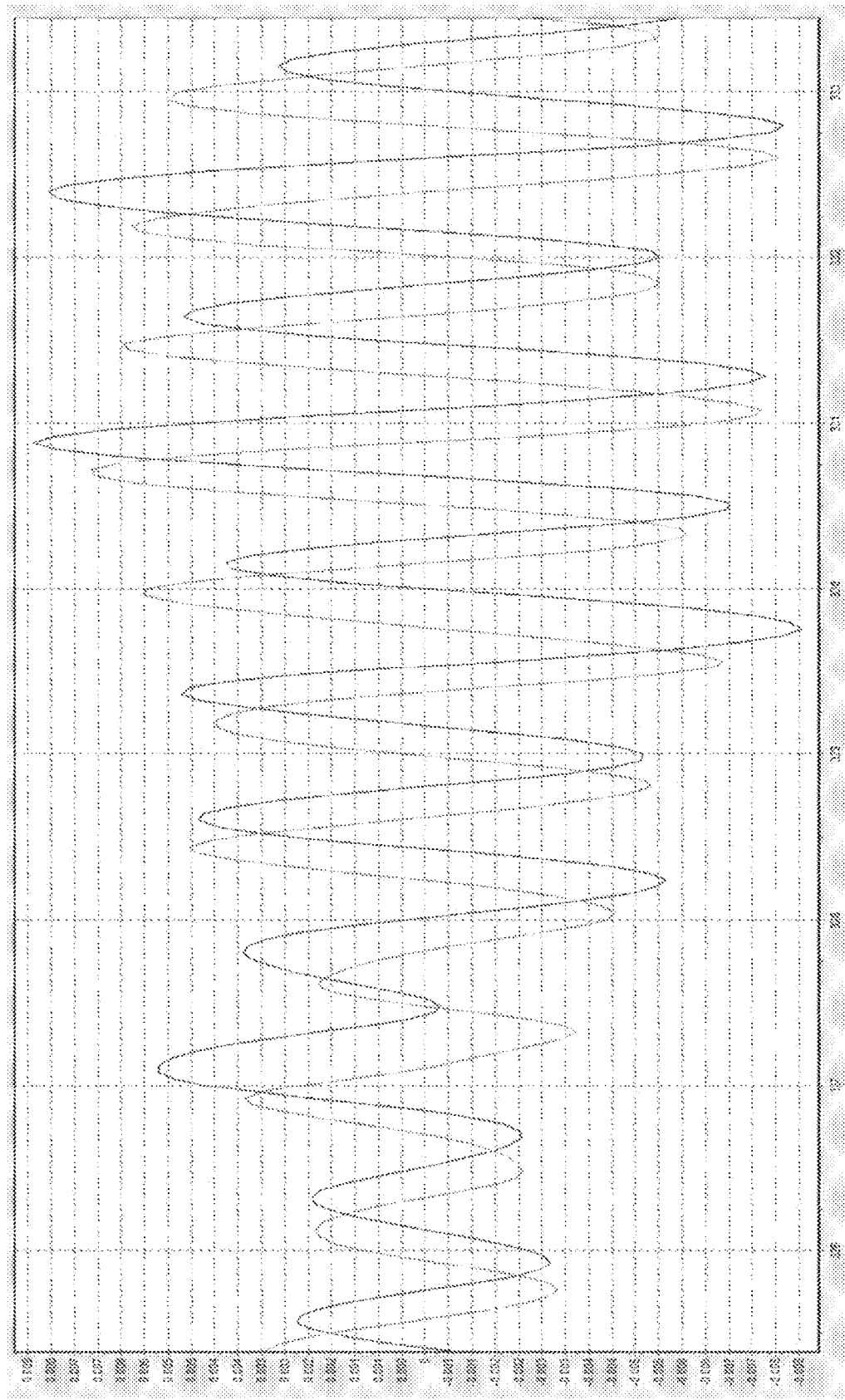
FIG. 4 shows a schematic plot of mutually orthogonal components, in a fixed coordinate frame of the wind turbine of FIG. 1, obtained from the SOGI of FIG. 3.

Prior to applying a SOGI—such as the SOGI 30 of FIG. 3—the received side-to-side signal may be cleaned to remove content related to vibrations or other motion related to different phenomena. For instance, the signal may be cleaned to remove one or more of steady-state, 1P and tower $1^{st}$ mode content. This can be achieved by a high-pass filter and two notches. In the illustrated example, 1P content (i.e. rotor rotational frequency content) is removed by application of a suitable notch filter 502, the tower frequency content is removed by application of a further suitable notch filter, and 3P content (i.e. blade rotational frequency content) is also removed 504. 1P content may be particularly present if there is an imbalance in the system, e.g. if one blade is heavier than others, or misaligned relative to the others. Tower frequency content may well be the dominant part of the received signal as the tower 2 tends not to be particularly well damped in the side-to-side direction. The 1P and tower $1^{st}$ mode signals are sufficiently far from the edge whirling modes (both backward and forward) that the notch can be tuned fairly broadly without too much influence on phase and gain distortion at the whirling mode frequencies. Furthermore, as it is known that notching out backward whirling from a forward whirling controller path (and vice versa) when working in the fixed frame with edge load signals does not introduce issues, it is reasonable to assume that notching can be done in a similar fashion with tower signals.

As illustrated in FIG. 5, there may exist separate branches in the control scheme for forward and backward whirling modes. In one branch (a 'forward branch'), frequency content relating to backward whirling modes (i.e. edge frequency minus 1P) may be removed from the signal, e.g. by a suitable notch filter 505a. The resulting side-to-side signal—referred to as the first component in the fixed frame—is then provided to the SOGI 30, which generates the second, orthogonal component in the fixed frame based on the first component as described above with reference to FIG. 3. A control action is then applied to the first and second components output by the SOGI 30 to obtain first and second control/resulting components. The control action may include application of a suitable gain-scheduled controller 507a. An output of the gain-scheduled controller 507a may be a first vector pointing in a first direction in the fixed coordinate frame. The direction of this vector may then be manipulated in control block 508a. The first and second control components that are then output from the control block 508a may form a second vector pointing in a second direction in the fixed frame, where the second vector may be determined to counteract the first vector. In some sense, the second vector may be regarded as being opposite to the first vector, such that the control signal is 'opposite' to what the wind turbine is doing, so as to mitigate the whirling mode. These control components are therefore aimed at addressing the forward whirling mode experienced by the wind turbine as indicated in the forward whirling frequency content of the received signal.

In the other branch of the control scheme (a 'backward branch'), corresponding processing may be performed as in the forward branch, but directed towards addressing the backward whirling content in the side-to-side signal. To this end, frequency content relating to forward whirling modes (i.e. edge frequency plus 1P) may be removed by a suitable notch filter 505b. A SOGI 30b may be applied, where the reference frequency is set to the backward whirling frequency (i.e. edge frequency minus 1P). A gain-scheduled controller 507b and vector manipulation control block 508b may then be applied in a corresponding manner to obtain first and second backward control components.

The application of an inverse Coleman transformation to generate a pitch signal may in addition to the orthogonal signals also require that the two signal components are of equal magnitude. In this regard each of the vector manipulation control blocks 508a, 508b can include or be followed by a saturation function implemented to saturate the amplitude of the resulting vector components.

The respective first control components from the forward and backward branches are combined to obtain the first control component, and the respective second control components from the forward and backward branches are combined to obtain the second control component. That is, a pair of two-dimensional vectors are added together to obtain a control vector including the first and second control components. For instance, this sum may be expressed as $$\begin{bmatrix} D_{FW} \\ Q_{FW} \end{bmatrix} + \begin{bmatrix} D_{BW} \\ Q_{BW} \end{bmatrix}$$

where $D_{FW}$ is the first forward control component (in the D direction of the DQ plane), $Q_{FW}$ is the second forward control component (in the Q direction of the DQ plane), $D_{BW}$ is the first backward control component, and $Q_{BW}$ is the second backward control component.

The control block 509 then performs an inverse m-blade transformation taking the first and second control components in the fixed frame as input, and providing the pitch reference offset values $\Delta\theta_1$, $\Delta\theta_2$, $\Delta\theta_3$ in the rotor rotational frame—also referred to as the ABC frame—as output. These offsets can then be combined with the collective pitch in the controller 20 as illustrated in FIG. 2.

Figure 6A:
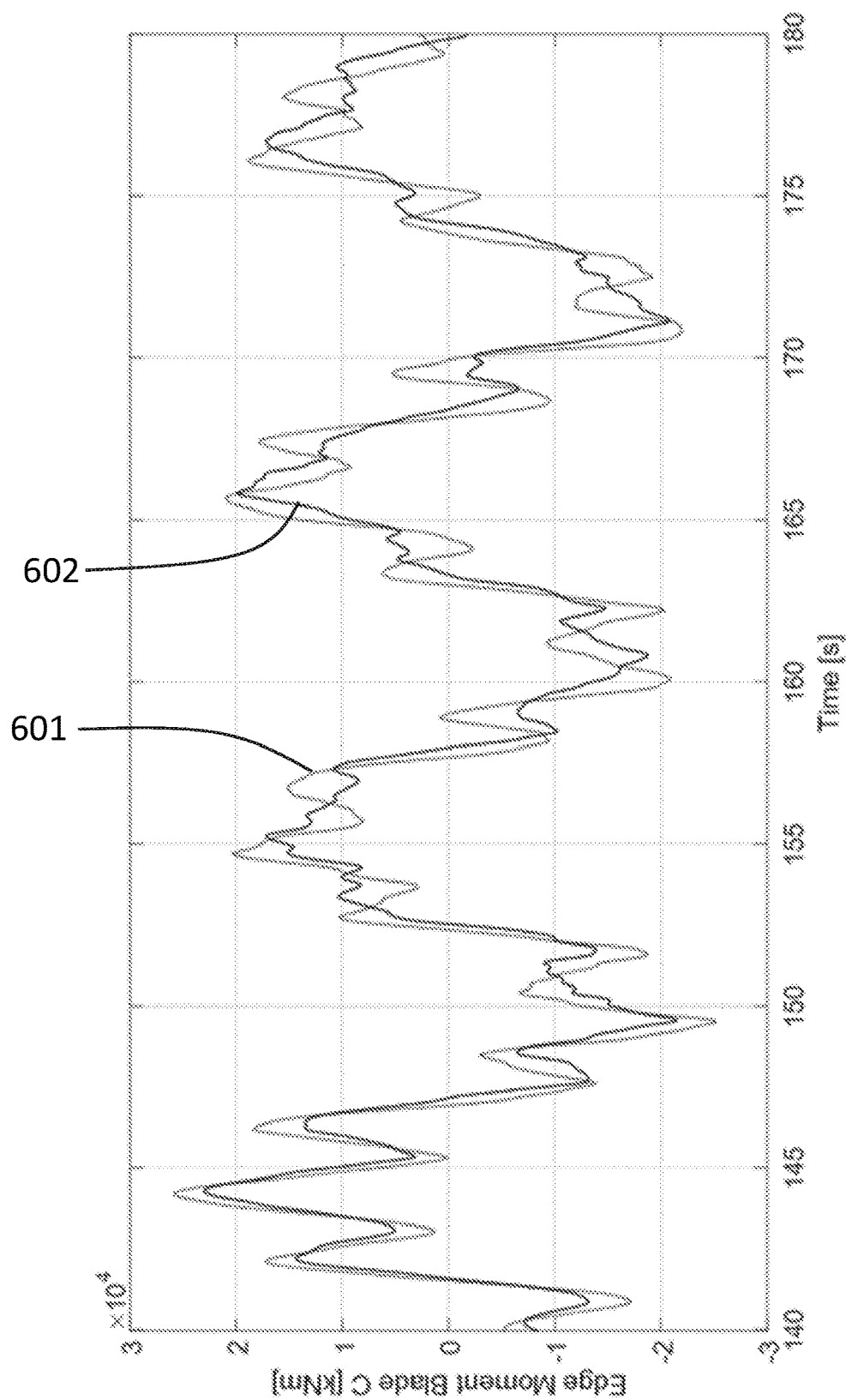
FIG. 6 shows plots illustrating results obtained by implementing the controller of FIG. 2; in particular, FIG. 6($a$) shows plots comparing an edgewise moment of a blade of the wind turbine of FIG. 1 over time with and without implementing the controller of FIG. 2, and FIG. 6($b$) shows plots comparing an edgewise Coleman cos-component of blades of the wind turbine of FIG. 1 over time with and without implementing the controller of FIG. 2; and, FIG. 7 summarises the steps of a method performed by the controller of FIG. 2 in accordance with the invention.
Figure 6B:
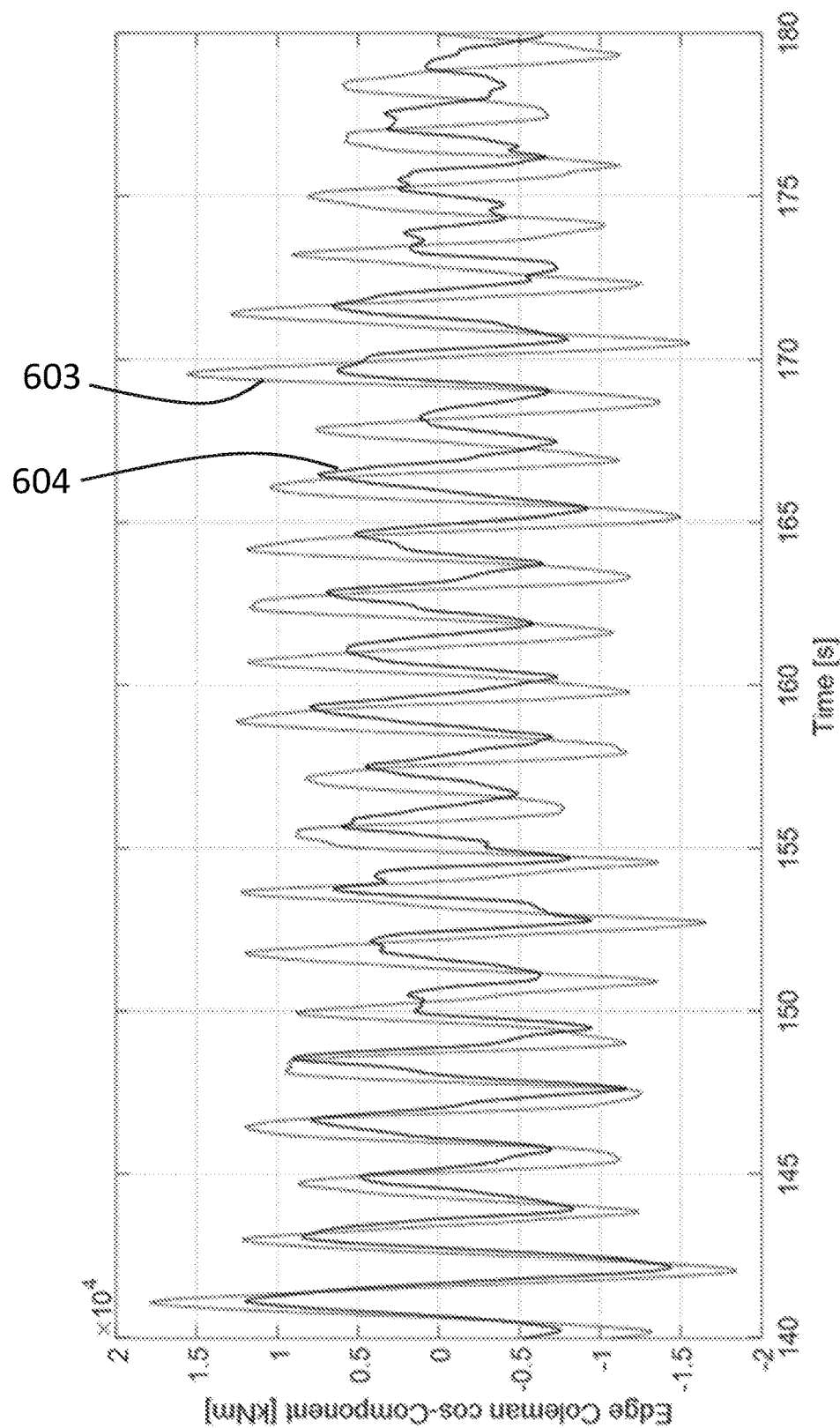

FIG. 6 illustrates advantageous results that may be obtained via application of the above-described method. In particular, FIG. 6(a) shows a plot of the edgewise moment of a blade over time in two cases: a first case—illustrated by the dotted line 601—in which the described whirling mode control approach has not been applied; and, a second case—illustrated by the solid line 602—in which the described whirling mode control approach has been applied. In both cases, it is noted that the edgewise moment is dominated by gravitational loads that oscillate with frequency 1P (rotor rotational frequency). The variations around the 1P content are what is targeted by the method described in this disclosure. It is seen from a comparison of the plots 601, 602 that application of the described method results in a dampening/reduction of the edgewise frequency content in the signals, i.e. the peaks in the plot 602 are reduced relative to the peaks in the plot 601. Also, FIG. 6(b) shows a plot of the Coleman cos-component of the edgewise moments of the blades over time in the two cases outlined for FIG. 6(a). That is, the dotted line 603 illustrates the case in which the described edgewise vibration damping method is not applied, and the solid line 604 illustrates the case in which the described method is applied. The effect of the whirling mode control method is apparent to an even greater extent in FIG. 6(b) than in FIG. 6(a), where the peaks of plot 604 are reduced compared to plot 603 to an even greater extent than in FIG. 6(a). Note that plots of the Coleman sin-component show a similar effect to the cos-component plots, except that there is an offset due to gravity.

Figure 7:
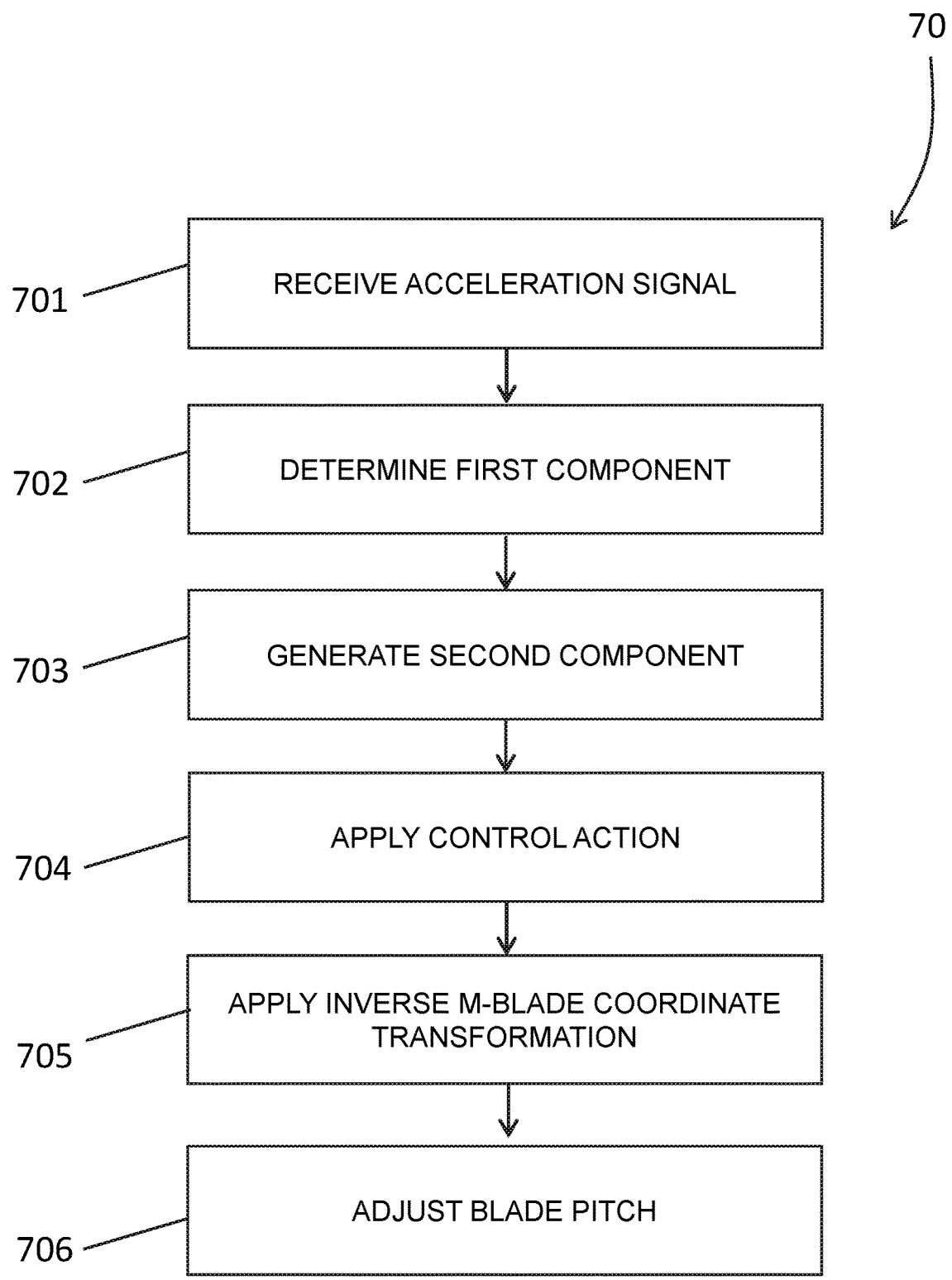

FIG. 7 summarises the steps of a method 70 performed by the controller 20 in accordance with an example of the invention, in particular for adjusting pitch of the three rotor blades 6 of the wind turbine 1. At step 701, the method 70 involves receiving an acceleration signal from an acceleration sensor located in the tower 2 (e.g. an upper or top part of the tower 2) or nacelle 3 of the wind turbine 1. The acceleration signal is indicative of side-to-side motion, i.e. acceleration, of the tower 2 or nacelle 3 of the wind turbine 1. The side-to-side direction may be substantially transverse to a longitudinal direction of the nacelle 3. The side-to-side direction may be a direction in the plane of the wind turbine rotor, but orthogonal to an axis of the tower 2.

At step 702, the method 70 involves determining a first component in a fixed coordinate frame of the wind turbine 1 based on the received acceleration signal. The first component is indicative of a whirling mode (whirling frequency content) of the wind turbine 1 caused by edgewise vibrations of one or more of the rotor blades 6. Determining the first component may involve removing frequency content indicative of other vibrations or motion of the wind turbine tower 2 (or other wind turbine components) included in the received acceleration signal. This could include removing one or more of 1P (rotor rotational frequency) content, 3P (blade rotational frequency) content, tower motion/vibration frequency content, etc. The removal of such frequency content may be via one or more filters, such as notch filters, high-pass filters, etc. If focusing on one of forward or backward whirling modes, then this could also involve removing backward whirling frequency content (blade edge frequency minus 1P) when addressing forward whirling modes and removing forward whirling frequency content (blade edge frequency plus 1P) when addressing backward whirling modes.

At step 703, the method 70 involves generating or synthesising a second component in the fixed coordinate frame that is orthogonal to the first component. In particular, the second component is determined based on the determined first component. The second component is generated by application of a second-order generalised integrator (SOGI) to the first component to providing a 90 degrees phase shifted component, to the first component.

At step 704, the method 70 involves applying a control action to the first and second components to obtain respective first and second control components. The control action may be suitable for mitigating the (forward and/or backward) whirling mode identified in the (forward and/or backward) whirling frequency content of the received signal. The control action may for instance comprise application of a gain-scheduled controller to the first and second components to obtain the first and second resulting/control components.

At step 705, the method 70 involves applying an inverse m-blade coordinate transformation, e.g. inverse Coleman transformation, to the first and second control components to obtain pitch reference offset values $\Delta\theta_1$, $\Delta\theta_2$, $\Delta\theta_3$ for the respective rotor blades 6 in a rotor coordinate frame of the wind turbine 1.

At step 706, the method 70 involves transmitting a control signal to adjust pitch of the rotor blades 6 based on the obtained pitch reference offset values $\Delta\theta_1$, $\Delta\theta_2$, $\Delta\theta_3$. In particular, the pitch reference offset values $\Delta\theta_1$, $\Delta\theta_2$, $\Delta\theta_3$ obtained from the PAU control unit 24 may be combined with a collective pitch reference, $\theta_{col}$ from the speed controller 22 to obtain resulting or overall pitch modification signals $\theta_A$, $\theta_B$, $\theta_C$ that may be applied to pitch actuators of the rotor blades 6 individually, as illustrated in FIG. 2, in order to adjust pitch of the rotor blades 6 to mitigate edge whirling modes.

In some examples, the above method 70 may be utilised to adjust blade pitch to mitigate whirling modes only if it is not possible to perform other methods for controlling blade pitch for this purpose. For instance, in the case in which the wind turbine includes blade load sensors, then the method 70 may be performed to control blade pitch only if at least one of the blade load measurements is unavailable to the wind turbine controller for whatever reason (such that blade pitch offsets cannot be determined based on the blade load signals). Even if one blade load signal is unavailable, a different method that first estimates the 'missing' blade load signal based on the other two available signals, and then determines the blade pitch offsets based on these signals, may be used. In such examples, the method 70 may therefore be used only if at least two of the blade load signals are unavailable (such that the estimation method is not possible or feasible). In this way, in some examples the method 70 may be regarded a backup or fallback method to ensure wind turbine operation continues substantially uninterrupted in the event of one or more sensor or signal failures or faults. In other examples, however, the method 70 may be used as a primary method for blade pitch control, e.g. in wind turbines that do not include blade load sensors.

The described controller 20 may be in the form of any suitable computing device, for instance one or more functional units or modules implemented on one or more computer processors. Such functional units may be provided by suitable software running on any suitable computing substrate using conventional or customer processors and memory. The one or more functional units may use a common computing substrate (for example, they may run on the same server) or separate substrates, or one or both may themselves be distributed between multiple computing devices. A computer memory may store instructions for performing the methods performed by the controller, and the processor(s) may execute the stored instructions to perform the method.

Many modifications may be made to the described examples without departing from the scope of the appended claims.

Although the above description generally refers to a Coleman transformation (or inverse Coleman transformation) for transforming between rotational and fixed reference frames, it will be understood that other suitable m-blade transformations may be used.

The invention claimed is:

1. A controller for a wind turbine having three rotor blades, the controller being for adjusting pitch of the three rotor blades, the controller being configured to:
   receive an acceleration signal from an acceleration sensor located in a tower or a nacelle of the wind turbine, the acceleration signal being indicative of side-to-side motion of the tower or nacelle of the wind turbine;
   determine a first component in a fixed coordinate frame of the wind turbine based on the received acceleration signal, the first component being indicative of a whirling mode of the wind turbine caused by edgewise vibrations of one or more of the rotor blades;
   generate, based on the determined first component, a second component in the fixed coordinate frame that is orthogonal to the first component, the second component is generated by application of a second-order generalised integrator to the first component;
   apply a control action to the first and second components to obtain respective first and second control components for mitigating the whirling mode;
   apply an inverse m-blade coordinate transformation to the first and second control components to obtain pitch reference offset values for the respective rotor blades in a rotor coordinate frame of the wind turbine; and,
   transmit a control signal to adjust pitch of the rotor blades based on the obtained pitch reference offset values.

2. The controller according to any previous claim 1, wherein applying the control action comprises application of a gain-scheduled controller to the first and second components.

3. The controller according to claim 2, wherein an output of the gain-scheduled controller is a first vector pointing in a first direction in the fixed coordinate frame, and wherein the first and second control components form a second vector pointing in a second direction in the fixed coordinate frame, the second vector being determined to counteract the first vector.

4. The controller according to claim 1, wherein determining the first component comprises applying a notch filter to:
   remove backward whirling content from the acceleration signal but retain forward whirling content; or,
   remove forward whirling content from the acceleration signal but retain backward whirling content.

5. The controller according to claim 4, wherein:
   determining the first component comprises determining a first forward component indicative of a forward whirling mode of the wind turbine and determining a first backward component indicative of a backward whirling mode of the wind turbine;
   generating the second component comprises generating a second forward component orthogonal to the first forward component and generating a second backward component orthogonal to the first backward component; and
   applying the control action to the first and second components comprises applying the control action to the first and second forward components and applying the control action to the first and second backward components, and combining the resulting components to obtain the first and second control components.

6. The controller according to claim 1, wherein determining the first component comprises application of a notch filter to remove 1P content from the received acceleration signal.

7. The controller according to claim 1, wherein determining the first component comprises application of a notch filter to remove tower first mode content from the acceleration signal.

8. The controller according to claim 1, wherein determining the first component comprises application of a high pass filter to remove steady-state content from the received acceleration signal.

9. The controller according to claim 1, wherein the inverse m-blade coordinate transformation is an inverse Coleman transformation.

10. The controller according to claim 1, the controller being configured to receive a blade load signal from a blade load sensor located in each respective rotor blade of the wind turbine, wherein the controller is configured to adjust pitch of the three rotor blades only if the blade load signal from at least one of the blade load sensors is unavailable to the controller.

11. The controller according to claim 10, wherein the controller is configured to adjust pitch of the three rotor blades only if the blade load signal from at least two of the blade load sensors is unavailable to the controller.

12. A method for adjusting pitch of rotor blades of a wind turbine, the method comprising:
receiving an acceleration signal from an acceleration sensor located in a tower or a nacelle of the wind turbine, the acceleration signal being indicative of side-to-side motion of the tower or nacelle of the wind turbine;
determining a first component in a fixed coordinate frame of the wind turbine based on the received acceleration signal, the first component being indicative of an edgewise whirling mode of the wind turbine;
generating, based on the determined first component, a second component in the fixed coordinate frame that is orthogonal to the first component, the second component is generated by application of a second-order generalised integrator to the first component;
applying a control action to the first and second components to obtain respective first and second control components for mitigating the edgewise whirling mode;
applying an inverse m-blade coordinate transformation to the first and second control components to obtain pitch reference offset values for the respective rotor blades in a rotor coordinate frame of the wind turbine; and,
transmitting a control signal to adjust pitch of the rotor blades based on the obtained pitch reference offset values.

13. A non-transitory, computer-readable storage medium storing instructions thereon that when executed by one or more processors cause the one or more processors to perform an operation of adjusting pitch of rotor blades of a wind turbine, the operation comprising:
receiving an acceleration signal from an acceleration sensor located in a tower or a nacelle of the wind turbine, the acceleration signal being indicative of side-to-side motion of the tower or nacelle of the wind turbine;
determining a first component in a fixed coordinate frame of the wind turbine based on the received acceleration signal, the first component being indicative of an edgewise whirling mode of the wind turbine;
generating, based on the determined first component, a second component in the fixed coordinate frame that is orthogonal to the first component, the second component is generated by application of a second-order generalised integrator to the first component;
applying a control action to the first and second components to obtain respective first and second control components for mitigating the edgewise whirling mode;
applying an inverse m-blade coordinate transformation to the first and second control components to obtain pitch reference offset values for the respective rotor blades in a rotor coordinate frame of the wind turbine; and
transmitting a control signal to adjust pitch of the rotor blades based on the obtained pitch reference offset values.

14. The non-transitory, computer-readable storage medium according to claim 13, wherein applying the control action comprises application of a gain-scheduled controller to the first and second components.

15. The non-transitory, computer-readable storage medium according to claim 14, wherein an output of the gain-scheduled controller is a first vector pointing in a first direction in the fixed coordinate frame, and wherein the first and second control components form a second vector pointing in a second direction in the fixed coordinate frame, the second vector being determined to counteract the first vector.

16. The non-transitory, computer-readable storage medium according to claim 14, wherein determining the first component comprises applying a notch filter to:
remove backward whirling content from the acceleration signal but retain forward whirling content; or,
remove forward whirling content from the acceleration signal but retain backward whirling content.

17. A wind turbine, comprising:
a tower;
a nacelle disposed on the tower;
a generator disposed in the nacelle;
a rotor operably coupled to the generator;
rotor blades operably coupled to an end of the rotor; and
a controller configured to perform an operation for adjusting pitch of the rotor blades, the operation comprising:
receiving an acceleration signal from an acceleration sensor located on the tower or the nacelle of the wind turbine, the acceleration signal being indicative of side-to-side motion of the tower or nacelle of the wind turbine;
determining a first component in a fixed coordinate frame of the wind turbine based on the received acceleration signal, the first component being indicative of an edgewise whirling mode of the wind turbine;
generating, based on the determined first component, a second component in the fixed coordinate frame that is orthogonal to the first component, the second component is generated by application of a second-order generalised integrator to the first component;
applying a control action to the first and second components to obtain respective first and second control components for mitigating the edgewise whirling mode;
applying an inverse m-blade coordinate transformation to the first and second control components to obtain pitch reference offset values for the respective rotor blades in a rotor coordinate frame of the wind turbine; and
transmitting a control signal to adjust pitch of the rotor blades based on the obtained pitch reference offset values.

18. The wind turbine according to claim 17, wherein applying the control action comprises application of a gain-scheduled controller to the first and second components.

19. The wind turbine according to claim 18, wherein an output of the gain-scheduled controller is a first vector pointing in a first direction in the fixed coordinate frame, and wherein the first and second control components form a second vector pointing in a second direction in the fixed coordinate frame, the second vector being determined to counteract the first vector.

20. The wind turbine according to claim 17, wherein determining the first component comprises applying a notch filter to:
remove backward whirling content from the acceleration signal but retain forward whirling content; or, remove forward whirling content from the acceleration signal but retain backward whirling content.

* * * * *